though this invention relates to alkyl aromatic compounds and
United States Patent Office 3,458,586
Patented July 29, 1969

3,458,586
LINEAR ALKYL AROMATIC COMPOUNDS AND
THEIR PREPARATION
Arthur W. Langer, Jr., Watchung, N.J., assignor to Esso
Research and Engineering Company, a corporation of
Delaware
No Drawing. Continuation-in-part of application Ser. No.
266,188, Mar. 19, 1963. This application Apr. 13, 1964,
Ser. No. 359,434
Int. Cl. C07c 3/52
U.S. Cl. 260—668
16 Claims

ABSTRACT OF THE DISCLOSURE

Alkyl aromatic compounds are prepared by reacting an aromatic compound (e.g., benzene, toluene, xylene, etc.) with ethylene at temperatures of 40–180° C. and pressures of at least 100 p.s.i.g. in the presence of a catalyst system which is a combination of non-aromatic, di-tertiary amine (e.g., tetramethyl ethylene diamine) with a lithium hydrocarbon (e.g., n-butyllithium). The resultant aromatic hydrocarbons have side chains ranging from $C_2$–$C_{1000}$.

---

This application is a continuation-in-part of my co-pending application S.N. 266,188, filed Mar. 19, 1963, and now abandoned.

This invention relates to alkyl aromatic compounds and their manufacture from aromatics or from alkylated aromatics. More particularly, this invention relates to the manufacture of compounds of the type $ArCHR_1R_2$ or $ArR_2$ wherein Ar is an aromatic radical or heterocyclic aromatic radical, $R_1$ is hydrogen, an aryl or a $C_1$–$C_{10}$ alkyl group and $R_2$ is a —$(C_2H_4)_xH$ group wherein $x$ is an integer of from 1 to 500, starting with compounds of the formula ArH or $ArCH_2R_1$ wherein Ar and $R_1$ are the same as indicated above. In a specific embodiment this invention relates to the addition of a number of moles of ethylene to a compound of the formula ArH or $ArCH_2R_1$ to form alkyl aromatic compounds suitable for conversion, as by sulfonation, to form biodegradable detergents.

Alkylated aromatic compounds have been prepared in a variety of ways such as the alkylation of benzene or substituted benzenes with long chain chlorinated hydrocarbons or alkyl halides in the presence of Friedel-Crafts type catalyst such as aluminum chloride. In place of alkyl halides, alcohols, olefins, ethers, dialkyl sulfates, alkyl sulfuric esters, alkyl sulfonates and phosphates and various other derivatives which are functionally equivalent to the alkyl halide may be used. It has also been proposed to prepare such alkylated aromatic compounds by heating short chain alkyl substituted benzenes with ethylene at high temperatures and pressures without a catalyst and with various catalysts including certain oximes and azines, peroxy compounds such as cumene hydroperoxide, hydrogen peroxide, alkyl peroxides and hydroperoxides, benzoyl peroxide and combinations of sodium and organic peroxy compounds.

It is the object of this invention to provide the art with a novel and advantageous method for preparing ary lparaffins from aromatics or methylated aromatics and ethylene. Many of these products are new compositions of matter and those which are known have no commercially attractive methods of preparation.

It is also the object of this invention to prepare ary lparaffins or mixtures of arylparaffins of suitable weight for use in the manufacture of biodegradable detergents from aromatics or methylated aromatics and ethylene. Specific products or mixtures of products obtained from this invention are useful as obtained or after chemical modification as fuel additives, plasticizers, specialty solvents, dewaxing aids, etc. Because of their high purity, they may be used in biological oxidations for the synthesis of chemicals. Because of the absence of branching in the compounds prepared in accordance with this invention, these compounds are particularly stable to thermal as well as oxidative degradation.

These and other objects will appear more clearly from the detailed specification which follows:

It has now been found that ary lparaffins can be readily prepared by reacting ethylene with compounds of the type ArH or $ArCH_2R_1$ wherein Ar stands for an aryl or heterocyclic aromatic radical and $R_1$ stands for hydrogen, aryl or a $C_1$ to $C_{10}$ alkyl group in contact with a catalyst system comprising an organometal compound such as butyl lithium and a bifunctional Lewis base. With this catalyst system it is possible to prepare aryl paraffins which form biodegradable detergents, upon sulfonation, at temperatures in the 40 to 180° C. range and at ethylene pressures in the 100 to 2000 p.s.i.g. range. The products are obtained catalytically under conditions of high chain transfer rates so that many moles of product are made per mole of catalyst. Pressure and temperature are normally adjusted to obtain the proper balance between activity and molecular weight distribution. In systems of high purity, catalyst efficiencies up to 1000 g./g. and higher can be achieved.

The aromatic compounds which may be reacted in accordance with this invention correspond to the formulae: ArH, or $ArCH_2R_1$ wherein $R_1$ has been defined above and Ar is an aromatic radical such as phenyl, tolyl, m-ethylphenyl, p-isopropylphenyl, naphthyl, pyridyl, etc. Suitable aromatic compounds which may be used are benzene, toluene, xylenes, ethylbenzene, butylbenzene, p-isopropyltoluene, alphamethylnaphthalene, etc., and aromatic heterocyclic compounds such as pyridine, methylpyridines, 5-methylquinoline, methyldibenzothiophenes, etc. The lighter products formed may be recycled and accordingly mixtures of two or more of the lower alkyl aromatics can be used as the feed material.

Ethylene alone is condensed with the foregoing aromatic compounds in contact with the organometal-bifunctional Lewis base catalyst system in accordance with the present invention.

Molecular weights may be varied widely, with the number of ethylene units added per aromatic molecule ranging from one up into the hundreds. For example, starting with benzene one can obtain any of the even-numbered n-alkylbenzenes, such as ethylbenzene, butylbenzene, $C_{200}H_{401}C_6H_5$, etc. Starting with toluene and "growing" on the methyl group, one can make any of the odd-numbered n-alkylbenzenes. Starting with propylbenzene, one can make the odd-numbered 3-phenylparaffins. Starting with xylene, one makes $CH_3C_6H_4CH_2(C_2H_4)_xH$. In general, starting with an alkyltoluene one makes $$RC_6H_4CH_2(C_2H_4)_xH$$

When the aromatic compound has an ethyl or higher alkyl group, growth occurs on the alpha carbon; for example, ethylbenzene yields 2-phenylparaffins.

The products which are of interest for making biodegradable detergents are $C_9$–$C_{15}$ alkylbenzenes. For such products, one starts with benzene, toluene, xylenes or mixtures and maximizes the yield of $C_9$–$C_{15}$ normal alkyl aromatics by use of lower temperatures and higher ethylene partial pressures. Lighter products are recycled to obtain 3- and 5-phenylparaffins from propylbenzene and amylbenzene, or 2-, 4- and 6-phenylparaffins from ethylbenzene, butylbenzene and hexylbenzene, or dialkylbenzenes from growth on the benzene ring. Over 60 wt. percent selectivity to detergent range products is possible by recycle of all light ends. Sulfonation of the mixed products yields excellent biodegradable detergents. The $C_{16}$ and higher alkylbenzene products may be sulfonated for use as oil soluble detergents. If desired, the light ends may be used as chemicals, raw materials, specialty solvents, etc., instead of being recycled.

The first component of the catalyst system used to effect the alkylation of the aromatics in accordance with this invention comprises an organometal which is selected from the group consisting of RLi and $R_2Mg$. R may be the same or different monovalent hydrocarbon radicals of 1 to 20 carbon atoms, preferably about 1 to 8 carbon atoms. Examples of suitable R groups include aryl radicals, cycloalkyl radicals and aliphatic radicals or their derivatives.

Specific examples of R groups for substitution in the above formula include methyl, ethyl, n-propyl, isopropyl, n-butyl, isobutyl, t-butyl, n-amyl, isoamyl, n-hexyl, n-octyl, n-decyl, and the like; allyl, 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, cyclopentadienyl, and the like; phenylcyclopentyl, phenylcyclohexyl, the corresponding naphthyl derivatives of cycloalkyl groups, and the like; phenyl, tolyl, xylyl, ethylphenyl, naphthyl, methylnaphthyl, dimethylnaphthyl, ethylnaphthyl, cyclohexylphenyl and the like.

Preferably, the first component is an alkyl magnesium or alkyl lithium wherein the alkyl radical contains 1 to 8 carbon atoms. Particularly preferred herein is n-butyllithium.

The second component of the catalyst system comprises a bifunctional Lewis base which is selected from the group consisting of di-(tertiary)-amines having the following general formulas:

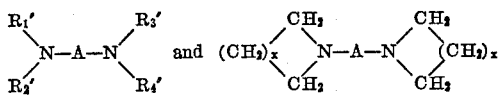

wherein $R_1'$, $R_2'$, $R_3'$ and $R_4'$ are the same or different alkyl radicals of 1 to 4 carbon atoms inclusive, A is a nonreactive group and X is an integer of 0 to 3 inclusive.

For the purposes of this invention, A in the above formulas is selected from the group consisting of (1) cycloaliphatic radicals and their lower alkyl derivatives having ring structures containing 5 to 7 members, wherein said radicals are attached to the nitrogen atoms at adjacent positions on the rings; suitable examples include N,N,N',N'-tetramethyl-1,2 - cyclopentanediamine, N,N,N',N'-tetramethyl-1,2-cyclohexanediamine; (2) a monoethylenic radical, said radical containing 0 to 2 monovalent hydrocarbon radicals of 1 to 8 carbon atoms; suitable examples include, N,N,N',N'-tetramethyl-1,2-diaminoethylene, N,N,N',N'-tetramethyl-3,4-diaminohexene-3, and the like; and (3) 1 to 4 methylenic radicals inclusive, wherein each methylenic radical contains 0 to 2 monovalent hydrocarbon radicals of 1 to 4 carbon atoms; suitable examples include 1,2-dipiperidyl ethane, N,N'-dimethyl-N,N'-diethyl-1,2 - ethanediamine, N,N,N',N'-tetramethyl-1,2-pentanediamine, N,N,N',N'-tetramethyl-1,2-propanediamine, N,N,N',N'-tetramethyl-2,3-butanediamine, N,N,N',N'-tetramethyl-1,4-butanediamine.

Particularly valuable as the second component of the catalyst system is an organic diamine having the general formula:

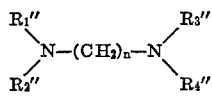

wherein $R_1''$, $R_2''$, $R_3''$ and $R_4''$ are the same or different alkyl radicals of 1 to 3 carbon atoms inclusive and n is an integer between 1 and 4 inclusive. Suitable examples include: N,N,N',N'-tetramethylmethanediamine, N,N-dimethyl-N',N'-diethyl-1,2-ethanediamine, N,N,N',N'-tetramethyl-1,2 - ethanediamine, N,N,N',N'-tetraethyl-1,2-ethanediamine, N,N,N',N' - tetraethyl - 1,2 - ethanediamine, N,N,N',N'-tetramethyl-1,3 - propanediamine, N,N,N',N'-tetramethyl-1,4-butanediamine, and the like.

The catalyst second components which are particularly preferred herein are N,N,N',N'-tetramethyl-1,2-ethanediamine, N,N,N',N'-tetramethyl-1,2 - cyclopentanediamine, N,N,N',N' - tetramethyl-1,2-propanediamine, N,N,N',N'-tetramethyl-1,3-propanediamine, and the like which form 5 to 6-membered chelates with the organometal compound.

In preparing and using catalysts according to this invention, all steps should be carried out in the absence of moisture and preferably also in the absence of oxygen or other harmful impurities. This may be readily done by blanketing the materials with an inert gas, such as dry nitrogen or argon. The raw materials, i.e. both the reactants and inert liquids, may be preferably purified or otherwise treated to remove traces of moisture, oxygen, carbon dioxide and other catalyst poisons. It is generally desirable that the monomer stream should contain less than about 200 p.p.m. and the inert liquid less than about 50 p.p.m. by weight of the aforementioned impurities.

In practicing one embodiment of this invention, it is generally desirable to prepare the catalyst system by premixing the selected organometal (i.e. the first component) with the selected bifunctional Lewis base. However, the components may also be mixed in the presence of ethylene. Although a catalyst system comprising one organometal and one bifunctional base is preferred, mixtures of organometals and bifunctional Lewis bases may also be employed. Generally, the molar ratio of the organometal to the bifunctional Lewis base is about 0.1:1 to 10:1, preferably 0.8:1 to 2:1.

As a matter of convenience, it is generally preferred to mix the catalyst components in the presence of an organic diluent, preferably the aromatic compound to be reacted with ethylene. The aromatic compound will normally serve as the polymerization medium if it is a liquid at the operating conditions of the polymerization reaction. If the aromatic compound is high melting, a saturated aliphatic or saturated cycloaliphatic hydrocarbon diluent having 2 to 20 carbon atoms may be used such as pentane, hexane, heptane, isooctane, cyclopentane, cyclohexane, decane, hexadecane, and the like.

Although the concentrations of the catalyst components are not critical, sufficient amounts of the aromatic or of aromatic plus diluent are preferably employed such that the concentration of the catalyst is normally in the range of 0.1 to 50 g./l., preferably 0.5 to 20 g./l. of the solution. As a matter of convenience, the individual catalyst components may be diluted prior to mixing. Standardized solutions of each catalyst component may be employed wherein the concentration of each solution is in the range of 0.1 to 5 Normal, preferably 1 to 4 Normal.

Although the temperatures required for the catalyst preparation are not critical, it is desirable to prepare the catalyst at temperatures ranging from about 0 to 100° C., preferably at temperatures in the range of 20 to 80° C. Since the catalyst components, after mixing, normally result in a liquid mixture, the catalyst can conveniently be prepared at atmospheric pressure.

When the catalyst has been prepared as stated above, it is placed in the reactor along with the aromatic feed and ethylene is injected into the reactor. The reaction is then carried out at a temperature of about 40 to 180° C., preferably 60 to 130° C. Ethylene is allowed to remain in contact with the aromatic compound in catalyst system for about 0.1 to 10 hours, preferably 0.5 to 5 hours, during which time more ethylene may be added so as to maintain the total pressure at the desired level which may be as low as about 100 p.s.i.g. and as high as 2,000 p.s.i.g. or higher if necessary, but preferably is in the range of 200 to 1500 p.s.i.g.

At the end of the reaction, the reaction mixture is cooled, washed with water or aqueous salt solutions to remove catalyst whereupon the liquid product is dried and then, if desired, subjected to distillation to separate the desired products.

Examples are given below to illustrate the preparation of some of the types of products described above.

EXAMPLE 1

To a 1.4 l. bomb was charged 600 ml. toluene (purified by percolation through activated alumina and stored over sodium wire), 4 ml. 1 M N,N,N',N'-tetramethyl-1,2-ethanediamine (TMEDA) in n-heptane (0.46 g., 0.004 mole) and two steel balls. A glass vial was charged with 5 ml. toluene and 2.56 ml. 1.56 N n-butyl lithium in hexane (0.26 g., 0.004 mole), sealed and placed in the bomb which was then sealed. All operations were carried out in a glove box under dry nitrogen.

The bomb was heated to 100° C. without shaking. Ethylene at 1000 p.s.i.g. was pressured into the bomb, the rocker was started to break the catalyst vial and mix the BuLi and N,N,N',N'-tetramethyl - 1,2 - ethanediamine (TMEDA) in the presence of ethylene. The temperature was raised to 110° C. and ethylene pressure was maintained at 1000 p.s.i.g. for 4 hours. The heat and rocker were then shut off and the bomb allowed to cool overnight.

The liquid product was washed with saturated aqueous $K_2CO_3$ solution to remove catalyst and dried over $K_2CO_3$. A sample of the total liquid product was then analyzed by gas chromatography using a temperature programmed column. The instrument was calibrated with n-propylbenzene and the weight percent yields of all of the products were calculated from the peak areas using the response factor for propylbenzene. The results are summarized in Table I and are compared with a control run carried out in a similar manner but without using the diamine cocatalyst (Run B).

TABLE I.—ALKYL AROMATICS FROM TOLUENE

| Run | A | B |
|---|---|---|
| TMEDA,[1] g | 0.46 | 0 |
| BuLi, g | 0.26 | 0.26 |
| Polymerization: | | |
| $C_2H_4$, p.s.i.g | 1,000 | 1,050 |
| Avg. temp., °C | 110 | 100 |
| Time, hrs | 4 | 4 |
| Yield, g | 53 | 1.6 |
| Product Distribution: | | |
| $\phi C_3$, wt. percent | 17.5 | 7.6 |
| $\phi C_{9-15}$, wt. percent | 32.3 | 30.0 |
| $\phi C_{25}+$ bottoms, wt. percent | 9.0 | 22.8 |
| Mono/disubstituted in the $C_{9-15}$ cut [2] | 14.4 | 1.19 |

[1] N,N,N',N'-tetramethyl-1,2-ethanediamine.
[2] Monosubstituted=$C_6H_5$—$CH_2R$.
  Disubstituted=$CH_3$—$C_6H_4$—R.

The BuLi·TMEDA catalyst gave high activity whereas the BuLi control gave only trace activity. Product distributions were also markedly different, with the BuLi·TMEDA catalyst yielding more light products than the control run. The most significant differences were in the product structures, with BuLi·TMEDA giving 94% $\phi CH_2R$ versus only 54% for the BuLi control. The latter gave much more ring attack to form $CH_3$—$C_6H_4$—R.

EXAMPLE 2

Following the procedures set forth in Example 1, the BuLi·TMEDA catalyst was used to grow polyethylene chains on benzene, xylene and ethylbenzene. Results are summarized in Table II together with the major catalyst and polymerization variables. These three reactants illustrate three additional types of products which can be made with the catalysts of this invention: $\phi R$, $CH_3$—$C_6H_4CH_2R$, and $\phi CH(CH_3)$—R. The major by-product from this reaction with ethylbenzene has the structure Et—$C_6H_4$—R.

TABLE II.—PREPARATION OF VARIOUS ALKYL AROMATIC COMPOUNDS

| Run | C | D | E |
|---|---|---|---|
| TMEDA, g | 0.23 | 0.23 | 0.23 |
| BuLi, g | 0.13 | 0.13 | 0.13 |
| Polymerization: | | | |
| Reactant | Benzene | Xylene | $C_6H_5Et$ |
| $C_2H_4$, p.s.i.g | 1,000 | 1,000 | 1,000 |
| Temp., °C | 130 | 110 | 120 |
| Time, hrs | 2 | 4 | 4 |
| Yield, g | 8.9 | 56 | 36 |
| Product Type: | | | |
| (a) Major | $C_6H_5R$ | $CH_3C_6H_4CH_2R$ | $C_6H_5\overset{CH_3}{\underset{H}{C}}$—R |
| (b) Minor | $C_6H_4R_2$ | $C_6H_4(CH_2R)_2$ | $EtC_6H_4R$ |
| Distribution: Major product wt. percent | 90 | 86 | 60 |

EXAMPLE 3

A series of experiments were carried out in a 1 l. stirred autoclave. Catalyst was placed in a 25 ml. pressure vessel together with 10 ml. toluene. The reactor was charged with toluene under a dry nitrogen atmosphere and heated to reaction temperature. Ethylene was introduced until the solution was saturated with ethylene at the desired pressure. The catalyst was then pressured into the reactor using a slight excess pressure of ethylene. Pressure was maintained constant by addition of ethylene as needed to replace that being consumed. After the desired reaction time at constant temperature and pressure, the reaction was terminated by rapidly chilling the reactor contents and venting the system. Any light products which were carried out with the ethylene were collected in a dry ice trap and added back to the total product. Catalyst removal and analysis of the total product were done as in Example 1.

The results are summarized in Table III. Comparison of Run H with control Run F again illustrates the remarkable effect of TMEDA on activity (277 vs. 13 g./hr./g. BuLi), molecular weight distribution, average molecular weight, and selectivity to the monoalkyl product.

In Run G, the TMEDA was added with the toluene and the BuLi was added separately at temperature. Comparison with Run H shows that precomplexing the BuLi with the bifunctional base gives much higher activity (277 vs. 104 g./hr./g. BuLi) although product distribution and structure are only slightly affected. Run I shows that the average molecular weight is increased by increasing the ethylene concentration (1000 vs. 600 p.s.i.g.). Run J shows the effects of lower temperature and long residence time. Activity dropped as the toluene concentration decreased due to its conversion into product. Molecular weight increased and the amount of dialkylbenzene increased as chain transfer with product molecules became more probable due to the very high product concentration. In Run K, the high reaction temperature produced a high selectivity to the low molecular weight products. Catalyst activity was lower than Run H at 125° C. due to catalyst decomposition and side reactions which increase rapidly between 130° and 150° C. such that only short residence times are attractive above about 160° C. From the number average molecular weight (149) it can be seen that only two ethylene units were attached on the average before termination occurred. Therefore, the bulk of the product was concentrated in the first few growth stages (propylbenzene, 40.7%; amylbenzene, 24.2%; heptylbenzene, 13.9%).

TABLE III.—ALKYLBENZENES FROM TOLUENE

| Run | F | G | H | I | J | K |
|---|---|---|---|---|---|---|
| TMEDA, g | None | 0.69 | 0.69 | 0.69 | 0.69 | 0.69 |
| BuLi, g | 0.39 | 0.39 | 0.39 | 0.39 | 0.39 | 0.39 |
| Premixed | | No | Yes | Yes | Yes | Yes |
| Polymerization: | | | | | | |
| Temp., °C | 125 | 125 | 125 | 125 | 100 | 140 |
| $C_2H_4$, p.s.i.g | 600 | 600 | 600 | 1,000 | 900 | 600 |
| Toluene, ml | 410 | 410 | 410 | 410 | 210 | 410 |
| Time, hrs | 1 | 2 | 1 | 1 | 4 | 1 |
| Yield, g | 5.1 | 81 | 108 | 102 | 144 | 76 |
| Rate, g./hr./g. BuLi | 13.0 | 104 | 277 | 262 | 92 | 195 |
| Product: | | | | | | |
| $\phi C_3$, wt. percent | 8.2 | 31.2 | 29.9 | 17.5 | 12.4 | 40.7 |
| $\phi C_{9-15}$, wt. percent | 28.6 | 27.1 | 26.6 | 32.0 | 31.5 | 18.5 |
| $\phi C_{25+}$, wt. percent | 22.5 | 2.1 | 1.8 | 6.6 | 14.1 | 0.3 |
| $\overline{M}_3$ [1] | 250 | 163 | 164 | 198 | 221 | 149 |
| Mono/Dialkylbenzenes | 2.8 | 13.7 | 10.5 | 11.1 | 8.4 | 8.9 |

[1] Number average molecular weight.

EXAMPLE 4

In order to isolate pure compounds from the mixtures obtained in these experiments, several of the toluene run products were combined and fractionated in a packed column. Since each compound is separated from its nearest boiling neighbors by two carbon units, the boiling point spread is about 30–50° C. which makes separation very simple. Thus, even with low efficiency distillation columns and rapid distillations one can easily obtain complete separation based on molecular weight in which the major component is present in over 90% concentration.

Results are shown in Table IV for the odd-numbered 1-phenylparaffins between $\phi C_3$ and $\phi C_{15}$. Except for the $\phi C_5$ cut which contained 6.8% $\phi C_3$ product, each cut was essentially pure based on molecular weight. Despite the wide boiling ranges, for each cut, the 1-phenylparaffin purity was between 89 and 97.9%. A 62% heart cut of the $\phi C_7$ product was 99.7% pure 1-phenylheptane according to gas chromatographic analysis. The extreme purity which is possible from a simple, once-through distillation of the products from this invention is due to the fact that the isomeric by products are either branched alkylbenzenes ($\phi CHR_1R_2$) or dialkylbenzenes $$(CH_3C_6H_4R \text{ or } R_1C_6H_4R_2)$$

which have widely different boiling points.

In these experiments, the 1-phenylparaffins up to $\phi C_{41}$ were separated and identified. Most of these compounds above about $\phi C_{11}$ had not previously been known. Although much higher molecular weight products were also made in this work, they were not isolated as pure compounds because of the increasingly difficult separation problem. This is not a drawback, however, since it is generally preferred to use wide ranges of high molecular weight products.

EXAMPLE 5

In a similar manner to Example 4, the even-numbered 1-phenylparaffins from $\phi C_2$ to $\phi C_{16}$ prepared according to this invention were separated by fractional distillation. Since there are fewer by-products in the reaction of ethylene with benzene than with toluene, the distillation cuts based on molecular weights are all high purity 1-phenylparaffins. By simply rejecting the material boiling between the plateaus of the distillation curve, product purities of 99.5 to 100% are obtained even up to high boiling points.

TABLE IV.—DISTILLATION PRODUCTS— ALKYLBENZENES FROM TOLUENE

| n-Alkylbenzene | Boiling Range, °C./mm.[1] | Percent of cut at each mol. cut | Percent Purity |
|---|---|---|---|
| $C_3H_7$ | 112–181/760 | 100 | 97.9 |
| $C_5H_{11}$ | 71–108/15 | 100 | [2] 86.9 |
| $C_7H_{15}$ | 103/6 | 62 | 99.7 |
| $C_9H_{19}$ | 109/1.8–121/1.5 | 74 | 92.7 |
| $C_{11}H_{23}$ | 121–151/1.5 | 100 | |
| $C_{13}H_{27}$ | 151–166/1.5 | 100 | |
| $C_{15}H_{31}$ | 166–181/1.5 | 100 | 89.0 |

[1] 30″ x 1″ packed column, 5/1 reflux ratio.
[2] Also contained 6.8% propylbenzene.

EXAMPLE 6

The alkyltoluene products prepared in Example 2 were fractionated on a spinning band column and the cuts were subjected to mass spectrographic analysis. Based on the parent mass peaks, each cut contained the molecular weight distributions shown in Table V. The major isomer in each case is the n-alkyltoluene. Since a mixture of xylene isomers was used in the reaction with ethylene, the products naturally contain the corresponding n-alkyltouene isomers.

If one starts with a single xylene isomer, one can obtain the corresponding n-alkyltoluenes in high purity. For example, one can make meta-alkyltoluenes starting from metaxylene, or para-alkyltoluenes starting from para-xylene, etc.

EXAMPLE 7

Various cuts from $\phi C_7$ to $\phi C_{17}$ from Example IV were combined, sulfonated according to standard procedures, and mixed with builders in typical detergent formulations. The detergents were evaluated in dishwashing and cotton laundering tests. Compositions containing $\phi C_{9-15}$ or $\phi C_{11-15}$ mixtures were outstanding detergents at low concentrations and were comparable or better than commercial formulations at higher concentrations. These products are biodegradable by virtue of their long straight chain alkylbenzene structure.

The high purity alkylbenzenes made according to this invention, their primary alkyl structure and their high percentage of unbranched alkyl groups permit almost quantitative sulfonation. Less than 3% unsulfonatable residue was obtained. The product was superior in color to competitive products.

EXAMPLE 8

In a process for making biodegradable detergents, it is desirable to maximize the yield of the detergent range products. As shown in Example 2, Run E, it is possible with the catalysts of this invention to react ethylbenzene with ethylene to obtain products of the type and $$\phi-\underset{\underset{H}{|}}{\overset{\overset{CH_3}{|}}{C}}-R$$

EtC6H4R. Therefore, one can recycle the lower molecular weight growth products (1-phenylparaffins) to increase selectivity to detergent range products. For example, the $\phi C_2$, $\phi C_4$, $\phi C_6$ and $\phi C_8$ products.

TABLE V.—DISTILLATION PRODUCTS [1]— ALKYLTOLUENES FROM XYLENE

| $CH_3C_6H_4R$ where R equals | Volume percent | | | | | |
|---|---|---|---|---|---|---|
| | Cut 1 | Cut 2 | Cut 3 | Cut 4 | Cut 5 | Btms. |
| $C_3$ | 8.0 | 2.0 | | | | |
| $C_5$ | 59.3 | 3.7 | | | | |
| $C_7$ | 31.9 | 85.8 | 4.9 | | | |
| $C_9$ | 0.8 | 8.2 | 89.0 | 17.4 | | |
| $C_{11}$ | | 0.3 | 5.6 | 76.1 | 13.5 | |
| $C_{13}$ | | | 0.5 | 6.1 | 74.1 | 0.9 |
| $C_{15}$ | | | | 0.4 | 11.4 | 11.5 |
| $C_{17}$ | | | | | 0.9 | 14.8 |
| $C_{19}$ | | | | | 0.1 | 14.2 |
| $C_{21}$ | | | | | | 13.6 |
| $C_{23}$ | | | | | | 13.2 |
| $C_{25}$ | | | | | | 12.1 |
| $C_{27}$ | | | | | | 9.3 |
| $C_{29}$ | | | | | | 5.6 |
| $C_{31}$ | | | | | | 3.0 |
| $C_{33-35}$ | | | | | | 1.8 |

[1] Spinning band column, 10/1 reflux ratio.

from the reaction of benzene with ethylene can be recycled together with make-up benzene. Alternatively, these compounds can be treated with ethylene in a separate reactor or reactors in order to take advantage of the optimum reaction conditions for each compound to make the desired detergent range product.

For the odd-numbered alkylbenzene process, which starts with toluene, the lower molecular weight growth products are $\phi C_3$, $\phi C_5$ and $\phi C_7$. That these can be recycled is shown in Table VI for propylbenzene. Reaction was carried out in the same manner as Example 3, Run H, except that reaction was continued for 2 hours and 50 minutes and only 210 ml. propylbenzene was used in place of the 410 ml. toluene.

TABLE VI.—Products from Recycle of Propylbenzene

| | |
|---|---|
| Yield, g | 42 |
| $\phi C_5$, wt. percent | 17.3 |
| $\phi C_{9-15}$, wt. percent | 31.7 |
| $\phi C_{25+}$, wt. percent | 11.6 |
| $M_n$ | 240 |

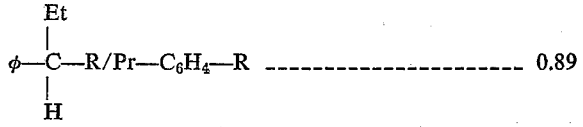

0.89

Comparison with Example 3, Run H, using toluene, show that ethylene growth on the alpha carbon of propylbenzene is much less favored than growth on the methyl group of toluene. The dialkylbenzene product in this case is over 50% of the total product whereas it was only about 10% with toluene. The secondary alkylbenzene product has the same structure as in the biodegradable detergents made from benzene by alkylation with straight chain alpha olefins. The di-primary-alkylbenzene products are sulfonatable and biodegradable by virtue of their complete lack of branching, and they contribute superior wetting properties, improved water solubility, etc., to the total detergent product.

EXAMPLE 9

Other bifunctional bases as described in this invention are also effective cocatalysts for organolithium catalysts. For example, toluene and ethylene were reacted with a catalyst comprising 0.948 g. N-methyl-N,N′,N′-triethyl-1,2-ethanediamine (0.006 mole) and 0.39 g. BuLi (0.006 mole) under conditions similar to Example 3, Run I. Product yield was 15.6 g., ranging between $\phi C_3$ and $\phi C_{37}$. The average molecular weight was 188.

EXAMPLE 10

When 3-methylpyridine is reacted with ethylene in the presence of 10 mmol. BuLi and 10 mmol. N,N,N′,N′-tetramethyl-1,2-propanediamine at 80° C. and 1000 p.s.i.g., the product consists mainly of 3-alkylpyridines.

EXAMPLE 11

When 1-methylnaphthalene is reacted with ethylene in the presence of 4 mmol $\phi CH_2Li$ and 4 mmol N,N,N′,N′-tetramethyl-1,2-cyclopentanediamine under conditions similar to Example 10, the product contains 1-alkylnaphthalenes.

EXAMPLE 12

When toluene is reacted with ethylene in the presence of 4 mmol $Bu_2Mg$ and 4 mmol N,N,N′,N′-tetramethyl-1,2-ethanediamine under conditions similar to Example 3, Run I, the product consists predominantly of the odd-numbered 1-phenylparaffins.

EXAMPLE 13

High molecular weight, linear alkyl aromatics may be prepared by using lower temperatures, lower concentrations of the aromatic compound in the reaction mixture, or by starting with the proper aryl lithium compound and carrying out the polymerization in an inert solvent. For example, 4 mmol phenyl lithium and 4 mmol N,N,N′,N′-tetramethyl-1,2-ethanediamine were used to polymerize ethylene in n-heptane solvent at 40° C. for 4 hours. Ethylene pressure was maintained at 2500 p.s.i.g. A yield of 6.27 g. solid product was obtained which contained the phenyl group from the catalyst at the end of each chain. From the viscosity in decahydronaphthalene at 135° C. an inherent viscosity of 0.293 was calculated, corresponding to an average molecular weight of 8600 based on the Chiang equation (J. Polymer Sci. 36, 91 (1959)).

Although this invention was illustrated mainly with aromatics and alkyl-aromatics, it is clearly within the scope of this invention to grow straight chain alkyl groups on a wide variety of condensed ring aromatics, heterocyclic aromatics such as pyridines, alkylpyridines and the like, quinoline, methylquinolines, acenaphthene, benzothiophene, etc. to obtain useful products, many of which are new compositions of matter.

The foregoing description contains a limited number of embodiments. It will be understood that this invention is not limited thereto since numerous variations are possible without departing from the scope of the following claims.

What is claimed is:

1. A method for the preparation of alkyl aromatic compounds which comprises reacting an aromatic compound selected from the group consisting of compounds of the formulas: ArH and $ArCH_2R_1$, wherein Ar is an aromatic or hetorocyclic aromatic radical and $R_1$ is selected from the group consisting of aryl radicals and $C_1$ to $C_{10}$ alkyl radicals with ethylene at temperatures of from 40–180° C. and at pressures from 100 to 2000 p.s.i.g. in contact with a catalyst comprising an organometal which is selected from the group consisting of RLi and $R_2Mg$, wherein R is a monovalent hydrocarbon radical containing 1 to 20 carbon atoms, and a bifunctional Lewis base which is selected from the group having the general formulas:

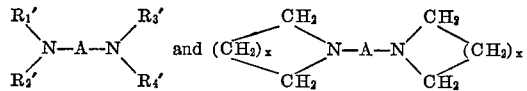

wherein $R_1'$, $R_2'$, $R_3'$ and $R_4'$ are alkyl radicals containing 1 to 4 carbon atoms inclusive, x is an integer of 0 to 3 inclusive, and A is selected from the group consisting of: (a) cycloaliphatic radicals and their lower alkyl derivatives having ring structures containing 5 to 7 members, wherein said radicals are attached to the nitrogen atoms at adjacent positions on the rings; (b) a monoethylenic radical, said radical containing 0 to 2 monovalent hydrocarbon radicals of 1 to 8 carbon atoms; (c) 1 to 4 methylenic radicals inclusive, wherein each radical contains 0 to 2 monovalent hydrocarbon radicals of 1 to 4 carbon atoms.

2. The process as defined in claim 1 wherein the aromatic compound used in benzene.

3. The process as defined in claim 1 wherein the aromatic compound is benzene and the organometal is an organolithium compound.

4. The process as defined in claim 1 wherein the aromatic compound is benzene, the organometal is an organolithium compound and the bifunctional Lewis base is a ditertiary amine which is capable of forming 5 to 6 membered chelates with the organolithium compound.

5. The process as defined in claim 1 wherein the aromatic compound used is toluene.

6. The process as defined in claim 1 wherein the aromatic compound is toluene and the organometal is an organolithium compound.

7. The process as defined in claim 1 wherein the aromatic compound is toluene, the organometal is an organolithium compound and the bifunctional Lewis base is a ditertiary amine which is capable of forming 5 to 6 membered chelates with the organolithium compound.

8. Method of producing alkyl aromatic hydorcarbons which comprises contacting ethylene with a benzenoid hydrocarbon at a temperature in the range of 40–180° C. in the presence of a catalyst system which is a combination of non-aromatic di-tertiary amine with LiR wherein R is a hydrocarbon radical having 1–20 carbon atoms selected from the group consisting of alkyl, cycloalkyl, alkenyl, phenyl, alkylphenyl and phenylalkyl.

9. Method according to claim 1 wherein said temperature is in the range of 80–150° C. and the ethylene is contacted at a pressure of 100–2000 p.s.i.g. or higher.

10. Method according to claim 8 wherein said amine is a chelating diamine.

11. Method according to claim 10 wherein said temperature is in the range of 80–150° C. and the ethylene is contacted at a pressure of 100–2000 p.s.i.g. or higher.

12. Method according to claim 8 wherein R is an alkyl radical.

13. Method according to claim 8 wherein said benzenoid hydrocarbon is selected from the group consisting of benzene, monoalkylbenzenes and dialkylbenzenes.

14. Method of producing alkyl aromatic hydorcarbons which comprises contacting ethylene at a pressure in the range of 100–200 p.s.i.g. or higher and at a temperature in the range of 40–180° C. with a benzenoid hydrocarbon selected from the group consisting of benzene, monoalkylbenzenes and dialkylbenzenes in the presence of a catalyst which is a combination of non-aromatic di-tertiary amine with LiR wherein R is a hydrocarbon radical having 1–20 carbon atoms selected from the group consisting of alkyl, cycloalkyl, alkenyl, phenyl, alkylphenyl and phenylalkyl, the proportion of said amine to LiR being such that the atomic ratio of N:Li is at least 0.2:1.

15. Method according to claim 14 wherein said amine is a chelating diamine.

16. Method according to claim 15 wherein said amine is N,N'-tetramethylethylene diamine.

References Cited

UNITED STATES PATENTS

| 3,169,987 | 2/1965 | Bloch | 260—671 X |
| 3,206,519 | 9/1965 | Eberhardt | 260—671 |

FOREIGN PATENTS 852,079   10/1960   Great Britain.

OTHER REFERENCES

Ferris, Handbook of Hydrocarbons, Academic Press Inc., New York (1955); pages 229, 240, 259, 265 and 267 are relied upon.

DELBERT E. GANTZ, Primary Examiner

CURTIS R. DAVIS, Assistant Examiner

U.S. Cl. X.R.

260—283, 290, 329, 671